US012575916B2

(12) United States Patent
Kato et al.

(10) Patent No.: US 12,575,916 B2
(45) Date of Patent: Mar. 17, 2026

(54) BLOCK FOR DENTAL PROSTHESES

(71) Applicant: GC CORPORATION, Shizuoka (JP)

(72) Inventors: Katsuhito Kato, Itabashi-ku (JP);
Shigenori Akiyama, Itabashi-ku (JP);
Toshihiko Azuma, Itabashi-ku (JP)

(73) Assignee: GC CORPORATION, Sunto-gun (JP)

( * ) Notice: Subject to any disclaimer, the term of this
patent is extended or adjusted under 35
U.S.C. 154(b) by 943 days.

(21) Appl. No.: 17/441,091

(22) PCT Filed: Jan. 9, 2020

(86) PCT No.: PCT/JP2020/000405
§ 371 (c)(1),
(2) Date: Sep. 20, 2021

(87) PCT Pub. No.: WO2020/202685
PCT Pub. Date: Oct. 8, 2020

(65) Prior Publication Data
US 2022/0183802 A1 Jun. 16, 2022

(30) Foreign Application Priority Data

Mar. 29, 2019 (JP) ................................. 2019-069287

(51) Int. Cl.
*A61C 13/00* (2006.01)
*C03C 4/00* (2006.01)
*C03C 10/00* (2006.01)
(52) U.S. Cl.
CPC ........ *A61C 13/0022* (2013.01); *C03C 4/0021*
(2013.01); *C03C 10/0027* (2013.01)

(58) Field of Classification Search
CPC .. C03C 4/0021; C03C 4/0007; A61C 13/0022
See application file for complete search history.

(56) References Cited

U.S. PATENT DOCUMENTS

| | | | |
|---|---|---|---|
| 5,219,799 A | 6/1993 | Beall et al. | |
| 9,700,392 B2 | 7/2017 | Hoshino et al. | |
| 2002/0010063 A1* | 1/2002 | Schweiger ............. | A61K 6/818 |
| | | | 106/35 |
| 2011/0256409 A1 | 10/2011 | Ritzberger et al. | |
| 2014/0228196 A1 | 8/2014 | Ritzberger et al. | |
| 2015/0087493 A1 | 3/2015 | Ritzberger et al. | |

(Continued)

FOREIGN PATENT DOCUMENTS

| | | |
|---|---|---|
| CN | 103889391 A | 6/2014 |
| CN | 104108883 A | 10/2014 |

(Continued)

OTHER PUBLICATIONS

International Search Report for PCT/JP2020/000405 dated Mar. 24, 2020.
Written Opinion for PCT/JP2020/000405 dated Mar. 24, 2020.

*Primary Examiner* — Matthew E. Hoban
(74) *Attorney, Agent, or Firm* — Sughrue Mion, PLLC

(57) ABSTRACT

A block for dental prostheses is in the form of a column or a board, a main crystalline phase of the block being of lithium disilicate, and when the block is observed in a field of view of a partially enlarged cross section of the block, the proportion of the total area of crystals having a length of at least 0.5 μm, the crystals appearing in the field of view, to an area of the field of view is at most 21%.

8 Claims, 4 Drawing Sheets

(56) References Cited

U.S. PATENT DOCUMENTS

| 2016/0236971 | A1 | 8/2016 | Rampf et al. |
| 2017/0290641 | A1* | 10/2017 | Kim ..................... C04B 37/042 |
| 2018/0133113 | A1 | 5/2018 | Hoshino et al. |
| 2018/0257973 | A1* | 9/2018 | Kim ........................ C03C 3/097 |

FOREIGN PATENT DOCUMENTS

| CN | 104379113 | A | 2/2015 |
| CN | 105683110 | A | 6/2016 |
| EP | 0 536 479 | A1 | 4/1993 |
| EP | 1 505 041 | A1 | 2/2005 |
| EP | 3 305 240 | A1 | 4/2018 |
| JP | 2018-145084 | A | 9/2018 |
| WO | 2012/175615 | A1 | 12/2012 |
| WO | 2012/2175615 | A1 | 12/2012 |
| WO | 2016/031399 | A1 | 3/2016 |
| WO | 2016/190012 | A1 | 12/2016 |

* cited by examiner

Fig. 3

BLOCK FOR DENTAL PROSTHESES

CROSS REFERENCE TO RELATED APPLICATIONS

This application is a National Stage of International Application No. PCT/JP2020/000405 filed Jan. 9, 2020, claiming priority based on Japanese Patent Application No. 2019-069287 filed Mar. 29, 2019.

TECHNICAL FIELD

The present disclosure relates to a block for dental prostheses.

BACKGROUND ART

According to recent technological developments in CAD/CAM (Computer-aided design/Computer-aided manufacturing), in making a dental prosthesis, a designed shape of a dental prosthesis is converted into a predetermined data format to be treated as digital data, and the data is transmitted to a processing machine; thereby, in the processing machine, machining such as cutting and grinding is automatically carried out on the basis of the data, to make a dental prosthesis. This makes it possible to rapidly provide dental prostheses.

It is demanded that such dental prostheses have strength, hardness, chemical durability in the oral environment, and the aesthetics (coloring, texture) same as natural teeth all of which are the basic functions as dental prostheses.

In addition to this, it is also important to machine complex shapes of rough surfaces dental prostheses have in a short time without any faults such as chipping. A material that can be processed in such a short time makes it possible to further rapidly make dental prostheses.

PTL 1 discloses the material for a dental prosthesis which includes predetermined components, to thereby achieve the improvement of the foregoing basic functions and cutting ability.

CITATION LIST

Patent Literature

PTL 1 WO20161031399

SUMMARY OF INVENTION

Technical Problem

An object of the present disclosure is to provide a block for dental prostheses with good machinability.

Solution to Problem

One aspect of the present disclosure is a block for dental prostheses before machined to form a dental prosthesis, wherein the block is in the form of a column or a board, a main crystalline phase of the block being of lithium disilicate, and when the block is observed in a field of view of a partially enlarged cross section of the block, a proportion of a total area of crystals having a length of at least 0.5 μm, the crystals appearing in the field of view, to an area of the field of view is at most 21%.

Here, "main crystalline phase" means a crystalline phase, the precipitation rate of crystals of which is the highest in crystalline phases observed on analysis by an X-ray diffractometer.

Hereinafter the same will be applied.

The proportion may be at most 1%.

The block may comprise: 60 mass % to 80 mass % of $SiO_2$; 10 mass % to 20 mass % of $Li_2O$; 3 mass % to 15 mass % of $Al_2O_3$; and 4.2 mass % to 10 mass % of $P_2O_5$.

The block may comprise: 60 mass % to 80 mass % of $SiO_2$; 10 mass % to 20 mass % of $Li_2O$; 3 mass % to 15 mass % of $Al_2O_3$; and 5 mass % to 10 mass/O of $P_2O_5$.

Further, the block may comprise: an oxide of at least one element selected from Na, K, Ca, Sr, Ba, Mg, Rb, Cs, Fr, Be and Ra.

Further, the block may comprise: at least one of an oxide of Ti and on oxide of Zr.

Further, the block may comprise: at least one selected from $V_2O_5$, $CeO_2$, $Er_2O_3$, MnO, $Fe_2O_3$ and $Tb_4O_7$.

Said machining may be cutting.

In the block, an area of voids in the cross section to an area of the cross section may be at most 2% on average.

In the block, no particulate matter in a coloring agent may be seen in a micrograph of the cross section at magnification ×200.

Advantageous Effects of Invention

According to the present disclosure, a block for dental prostheses with good machinability is obtained.

BRIEF DESCRIPTION OF DRAWINGS

FIG. 3 is an explanatory view of a method of measuring proportion.

DESCRIPTION OF EMBODIMENTS

Examples of specific embodiments will be hereinafter described. The present invention is not limited to these embodiments.

A block for dental prostheses according to one embodiment (hereinafter may be referred to as "block") is in the form of a column including rectangular and round columns, or of a board (disk). The shape of the block is changed to form a dental prosthesis or a dental prosthesis is cut out from the block, by machining such as cutting and grinding. Among them, a dental prosthesis in the form of a rectangular column or a board (disk) can be made by cutting. Blocks in the form of a rectangular column may be mainly used for cutting out a single dental prosthesis. Blocks in the form of a board may be used for cutting out a plurality of dental prostheses from one block.

Figure 1:
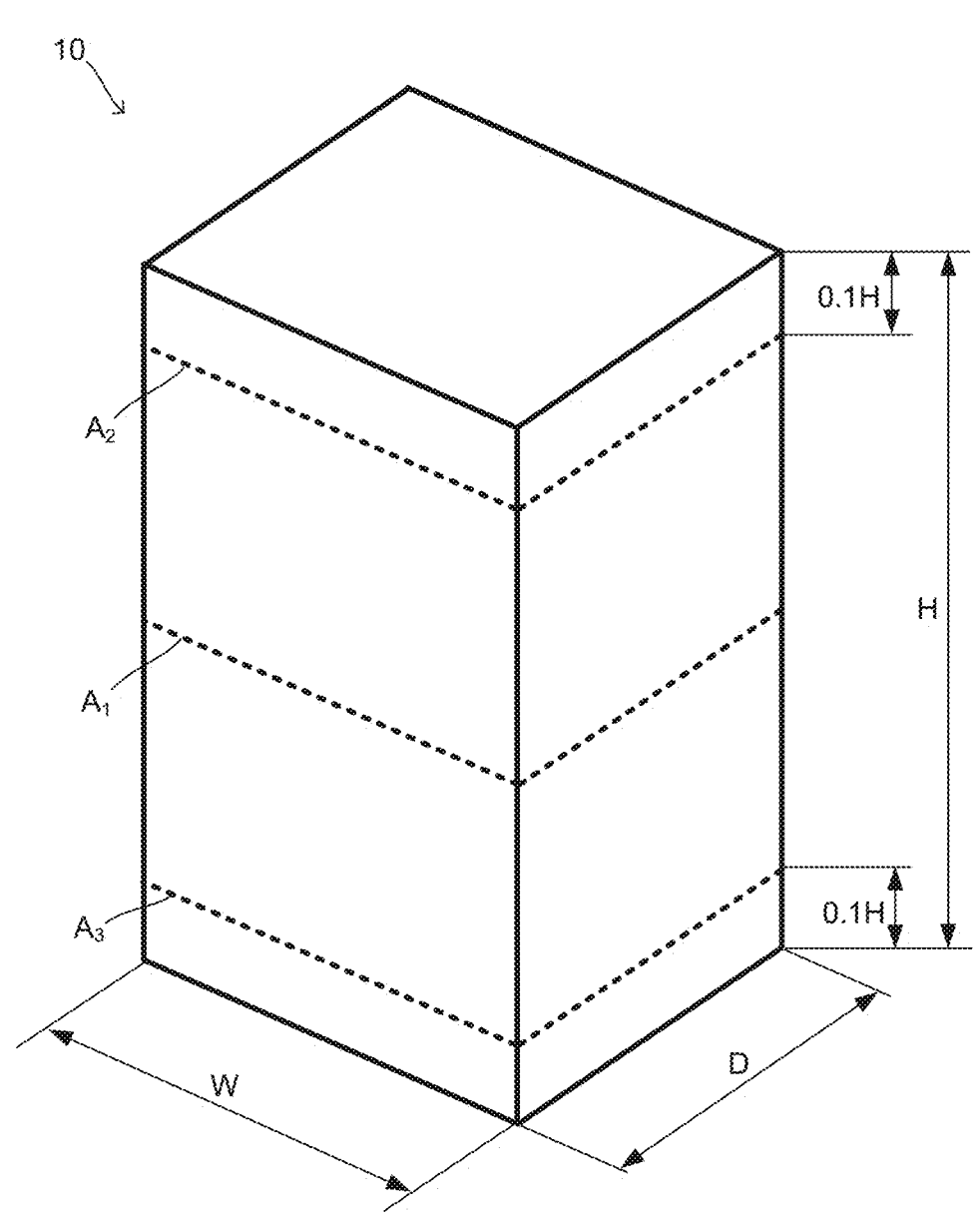
FIG. 1 is an external perspective view of a block for dental prostheses 10.

FIG. 1 is an external perspective view of a block 10 of a rectangular column. The rectangular column may have the width W, the depth D, and the height H within the range of 10 mm to 35 mm each. In contrast, in the case of a block in the form of aboard, the block may be formed to have the thickness within the range of 10 mm to 35 mm.

This leads to the block of which a dental prosthesis is easy to be made by cutting.

Figure 2:
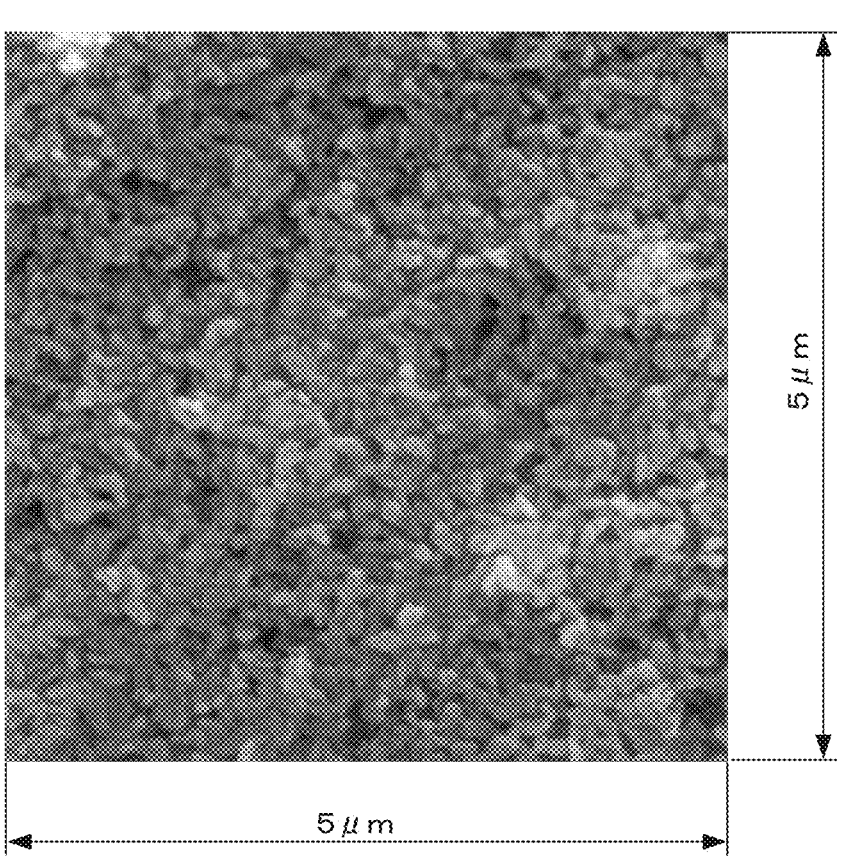
FIG. 2 shows a partially enlarged cross section such that crystals can be seen.

The block 10 according to the present embodiment, which is shown in FIG. 1, has the following structure. FIG. 2 shows a partially enlarged cross section of the block 10 which is taken along the broken line shown by the reference sign $A_1$ in FIG. 1. This drawing is an enlarged view of a field of view of a length (width direction) of 5 μm and a breadth (depth direction) of 5 μm. Such a drawing may be obtained from a scanning electron microscope (SEM) image.

The main crystalline phase of the block 10 is of lithium disilicate. Here, "main crystalline phase" means a crystalline phase, the precipitation rate of crystals of which is the highest in crystalline phases observed on analysis by an X-ray diffractometer.

When crystals having a length of at least 0.5 μm are extracted from individual crystals of the block 10 appearing within the field of view shown in FIG. 2, the proportion of the total area of the extracted crystals to the area of the field of view shown in FIG. 2 (5 μm×5 μm) is at most 21%. This proportion is preferably at most 10%, and further preferably at most 1%.

This makes it possible to cut and/or grind the block whose main crystalline phase is of lithium disilicate under the same or better conditions as or than those for processing blocks of conventional materials that are easy to process (such as a material whose main crystalline phase is of lithium metasilicate). This does not require heat treatment after processing which is, for example, necessary for a block whose main crystalline phase is of lithium metasilicate, which may form a dental prosthesis as the accuracy of machining is kept without change in the shape.

The proportion as described above is obtained as follows.

Figure 3:
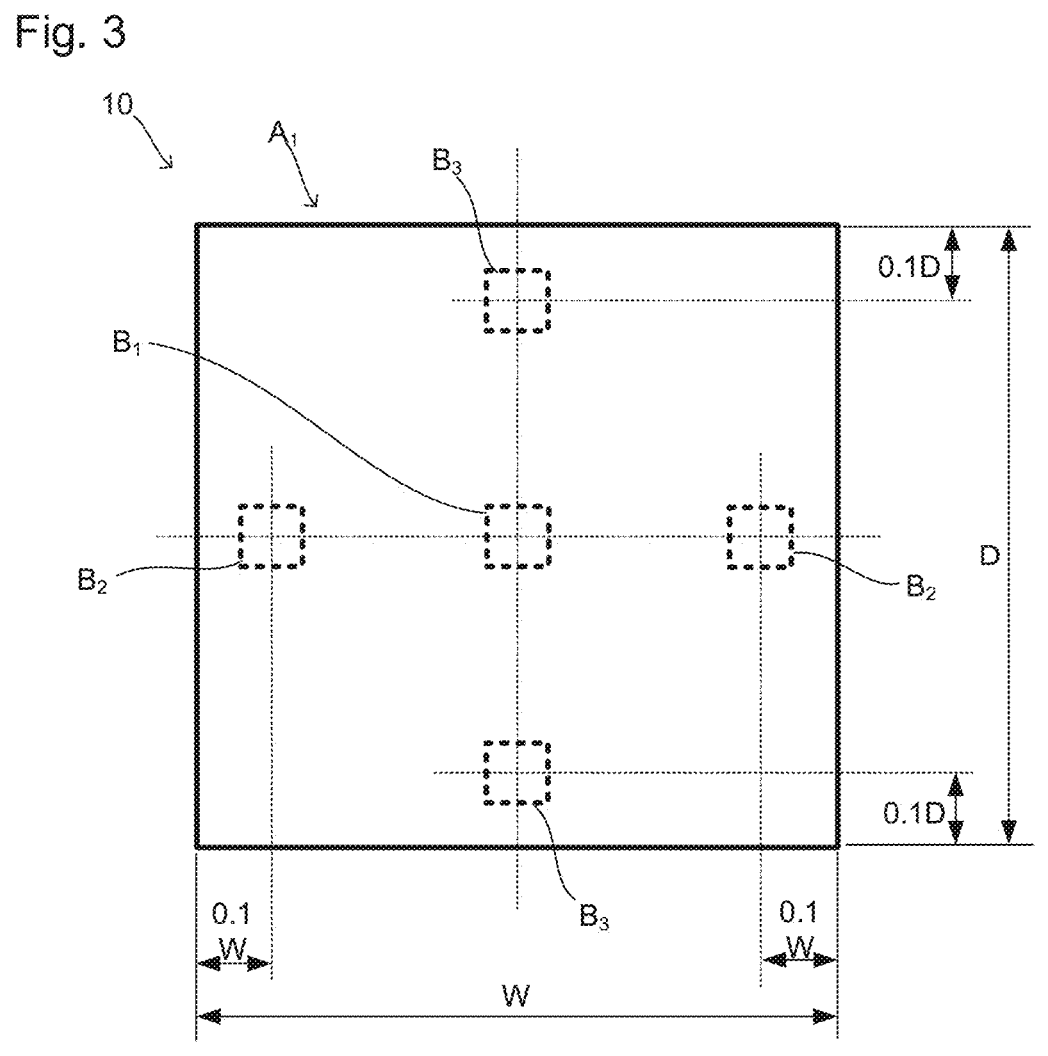

The block 10 shown in FIG. 1 is an example here. Three cross sections that are along the center $A_1$, and along the two edge portions $A_2$ and $A_3$ that are along the places 10% from the end faces to the full length H, in the direction of the largest amount (the height direction in the example in FIG. 1) are obtained. FIG. 3 shows the cross section along the center $A_1$ among the three cross sections.

An image by a scanning electron microscope having the field of view of 5 μm×5 μm as shown in FIG. 2 is obtained for each of the center $B_1$, two end portions $B_2$ that are adjacent to each other across the center $B_1$ in the width direction W at the positions 10% from the end portions to the total width W, and two end portions $B_3$ that are adjacent to each other across the center $B_1$ in the depth direction D at the positions 10% from the end portions to the total depth D; $B_1$ to $B_3$ are shown by the broken lines. This is applied to each of the cross sections along the center $A_1$, the end portion $A_2$, and the end portion $A_3$. Therefore, five for each cross section, that is, fifteen of such images in total are obtained. The upper part of FIG. 4 shows an example of the obtained images.

Figure 4:
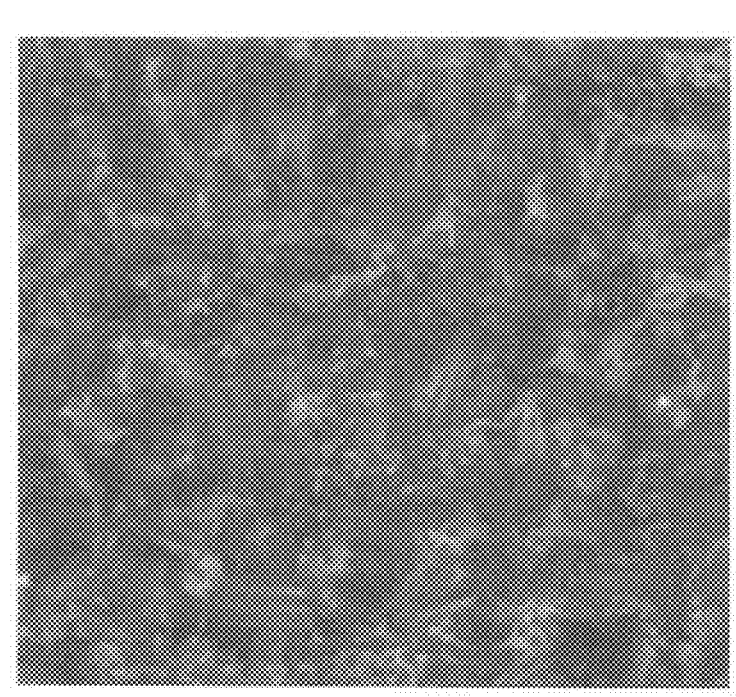
FIG. 4 is another explanatory view of the method of measuring proportion.
Figure 4:
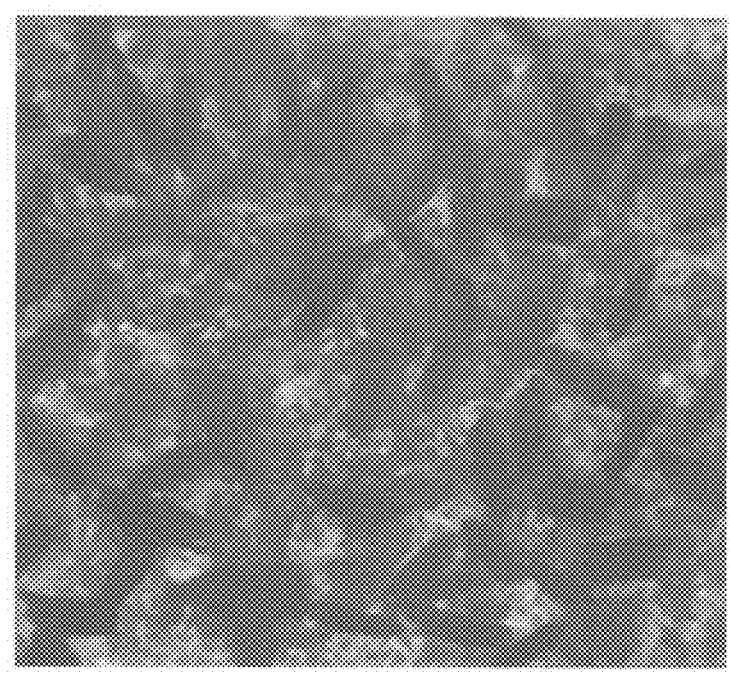

Next, as shown in the lower part of FIG. 4, crystals having a length of at least 0.5 μm (painted parts in the lower part of FIG. 4) are extracted from the crystals appearing in the lower part of FIG. 4, to obtain the total area S of the extracted crystals for each image. Next, the total area S is divided by the area $S_0$ of the field of view of the image (5 μm×5 μm) to be represented in percentages, to obtain the proportion for each individual image ($S/S_0 \times 100\%$). Thus, the respective proportions for the fifteen images are obtained.

The mean value of these respective proportions are calculated to be defined as the proportion.

The proportion obtained as described above may be at most 21%.

The block according to the present embodiment may be constituted of the following components, and the main crystalline phase thereof is of lithium disilicate:

60 mass % to 80 mass % of $SiO_2$;

10 mass % to 20 mass % of $Li_2O$;

3 mass % to 15 mass % of $Al_2O_3$; and 4.2 mass % to 10 mass % of $P_2O_5$.

Each of the foregoing components are as follows.

When the block contains less than 60 mass % or more than 80 mass % of $SiO_2$, it is difficult to obtain a homogeneous block. $SiO_2$ is more preferably 65 mass % to 75 mass %.

When the block contains less than 10 mass % or more than 20 mass % of $Li_2O$, it is difficult to obtain a homogeneous block, and machinability tends to deteriorate. $Li_2O$ is more preferably 12 mass % to 18 mass %.

When the block contains less than 3 mass % of $Al_2O_3$ on the one hand, machinability tends to deteriorate while lithium disilicate precipitates to constitute a main crystalline phase. When the block contains more than 15 mass % of $Al_2O_3$ on the other hand, the main crystalline phase is not of lithium disilicate, which leads to a tendency to lower strength. $Al_2O_3$ is more preferably 3 mass % to 7 mass %.

When the block contains less than 4.2 mass % of $P_2O_5$ on the one hand, crystals having a length of at least 0.5 μm tends to increase, and machinability may deteriorate. $P_2O_5$ is preferably at least 5 mass %. When the block contains more than 10 mass % of $P_2O_5$ on the other hand, the block tends to be devitrified, which makes it difficult to obtain a transparent block.

Further, the block for dental prostheses may contain the following components in addition to the foregoing components. The components listed here are not necessarily contained as can be seen from the fact that the amounts thereof may be 0 mass %. It means that at least any one of them may be contained.

The block may contain 0 mass % to 15 mass % of a component for adjusting the melting temperature. This makes it possible to have a suitable melting temperature in the production described later. The block may contain more than 15 mass % of some respective components. The improvement of the effect thereof however has its limits. Specific examples of materials for adjusting the melting temperature include oxides of Na, K, Ca, Sr, Ba, Mg, Rb, Cs, Fr, Be and Ra, which are further preferably as follows:

$Na_2O$: at most 2.8 mass %;

$K_2O$: at most 10 mass %;

CaO: at most 3 mass %;

SrO: at most 10 mass %;

BaO: at most 10 mass %;

MgO: at most 3 mass %;

$Rb_2O$: at most 2.8 mass %;

$Cs_2O$: at most 2.8 mass %;

$Fr_2O$: at most 2.8 mass %;

BeO: at most 3 mass %; and

RaO: at most 10 mass %.

The block may also contain 0 mass % to 10 mass % of a component for forming crystal nuclei. This leads to efficient generation of nuclei to form crystals of lithium disilicate. The upper limit is 10 mass % because the improvement of the effect thereof has its limits even if the block contains more than 10 mass % of such a compound. Here, examples of compounds to function as materials for forming crystal nuclei include oxides of Zr and Ti ($ZrO_2$ and $TiO_2$). At this time, the block preferably contains 0 mass % to 10 mass % of at least one selected from $ZrO_2$ and $TiO_2$ in total.

The block for dental prostheses may further contain a known coloring agent in view of improving aesthetics. Examples thereof include at least one selected from $V_2O_5$, $CeO_2$, $Er_2O_3$, MnO, $Fe_2O_3$ and $Tb_4O_7$.

Here, preferably, no void is seen in the block for dental prostheses. Since the influence of a few voids is believed to be slight, the area of voids to that of the observation range of 60 μm in length (width direction)×60 μm in breadth (depth direction) is preferably at most 2% on average, for each of the fifteen parts where the foregoing proportions are measured.

Preferably, no particulate matter in the coloring agent is visually seen in a micrograph at magnification ×200 for each of the fifteen parts where the foregoing proportions are measured.

These void and particulate matter may generate the interface with a base material to influence machinability. The presence of any particulate matter in the coloring agent may cause color irregularities in dental prostheses.

Such a block for dental prostheses can be surely realized by melting to mold materials as described later, but not by powder molding.

The foregoing block for dental prostheses, and a dental prosthesis made by processing the block can have strength, hardness, chemical durability in the oral environment, and the aesthetics (coloring, texture) same as natural teeth all of which are the basic functions as dental prostheses. In addition to this, machinability is improved, which makes it possible to carry out machining without any faults under the same or better processing conditions as or than those for conventional ceramic blocks for cutting although strength such that heat treatment after processing is not necessary is obtained.

Next, an example of the method of making a dental prosthesis will be described. This includes the method of making the block for dental prostheses. The making method of the present embodiment includes a melting step, a step of making a glass blank, a step of forming nuclei, a step of heat treatment, a cooling step, and a processing step.

In the melting step, each of the above described components is molten at a temperature from 1100° C. to 1600° C. This makes it possible to obtain molten glass for the block for dental prostheses. This melting is preferably carried out for several hours in order to obtain sufficient homogeneity.

The step of making a glass blank is a step of obtaining a glass blank having a shape similar to the block for dental prostheses. The molten glass obtained in the melting step is poured into a mold and cooled to room temperature, to obtain the glass blank. The cooling is carried out in a slow temperature change in order to prevent change in quality of, and cracks in materials.

The step of forming nuclei is a step of heating and keeping the glass blank obtained in the step of making a glass blank at a temperature form 400° C. to 600° C. for a predetermined time. This forms nuclei for generating crystals. The keeping time has only to be a time for forming sufficient nuclei, which is preferably at least 10 minutes. The upper limit of this time is not particularly limited, and may be at most 6 hours.

The step of heat treatment is a step of heating and keeping the glass blank at a temperature from 800° C. to 1000° C. for a predetermined time without cooling. This makes it possible to obtain a lithium disilicate blank whose main crystalline phase is of lithium disilicate. The keeping time is preferably at least 1 minute, and further preferably at least 3 minutes. The upper limit of this time is not particularly limited, and may be at most 3 hours.

In the steps of forming nuclei and heat treatment, the temperature is necessary to be kept within a predetermined range as described above. The temperature is not necessarily kept fixed as long as being within a predetermined range. That is, the temperature may continue to rise.

The step of heat treatment may include an intermediate stage where the temperature is different. That is, following the step of forming nuclei, the glass blank is heated and kept, for example, at a temperature from 600° C. to 800° C. for a predetermined time without cooling before being kept at a temperature from 800° C. to 1000° C. as described above. This generates crystals, to obtain intermediates. The keeping time at this time is preferably at least 10 minutes. The upper limit of this time is not particularly limited, and may be at most 6 hours. Heating as keeping at a temperature from 800° C. to 1000° C. without cooling may be carried out after this intermediate stage.

The cooling step is a step of cooling the lithium disilicate blank obtained by the step of heat treatment to room temperature. This can turn the lithium disilicate blank into the block for dental prostheses to be supplied to the processing step.

The processing step is a step of machining the obtained block for dental prostheses, to process the block to have a shape of a dental prosthesis. The machining method is not particularly limited, and examples thereof include cutting and grinding. This makes it possible to obtain a dental prosthesis.

This processing can be carried out under good conditions for productivity. That is, conventional blocks for dental prostheses whose main crystalline phase is of lithium disilicate with poor machinability are difficult to be efficiently cut. Therefore, a block of materials easy to process whose main crystalline phase is not of lithium disilicate (such as a block whose main crystalline phase is of lithium metasilicate) is processed, and to be further heat-treated to be converted into lithium disilicate, that is, a step of improving the strength has to follow.

In contrast, according to the present embodiment, even a block whose main crystalline phase is of lithium disilicate can be cut and/or ground under the same or better conditions as or than those for processing on materials that are easy to process. Heat treatment after processing is not necessary either, which can form a dental prosthesis without change in the shape as the accuracy of machining is kept.

EXAMPLES

In Examples 1 to 10 and Comparative Examples 1 to 4, a block whose main crystalline phase is of lithium disilicate was prepared according to the making method by the above described melt molding, to make a dental prosthesis by cutting, and machinability was evaluated. In each example, the contained components were changed.

The block in each example was made as follows.

In each example, the materials shown in Table 1 were mixed according to the proportions therein and molten at 1300° C. for 3 hours, to obtain molten glass (melting step). Next, this obtained molten glass was poured into a mold and cooled to room temperature, to form a glass blank (step of making a glass blank). Then, the obtained glass blank was heated and kept at 650° C. for 60 minutes (step of forming nuclei). The resultant was further heated and kept at 850° C. for 10 minutes, to form a lithium disilicate blank whose main crystalline phase was of lithium disilicate (step of heat treatment). Thereafter the resultant was slowly cooled to room temperature (cooling step), to obtain the block.

The obtained block was a rectangular parallelepiped having the width W of 14 mm, the depth D of 12 mm and the height H of 18 mm.

Table 1 shows the content of each component in mass %. Table 1 also shows the proportion (%) of crystals having a length of at least 0.5 μm, which was obtained by the above described method, and machinability. Blanks in rows of components in Table 1 show the corresponding content was 0 mass %.

The main crystal was measured by means of an X-ray diffractometer (Empyrean™; manufactured by Spectris Co., Ltd.); as a result of a quantitative analysis by the Rietveld refinement, a crystalline phase, the precipitation rate of crystals of which was the highest in the observed crystalline phases was defined as the main crystalline phase. All the main crystalline phases of the blocks in the present examples and comparative examples were of lithium disilicate.

"Proportion" is the foregoing proportion of crystals having a length of at least 0.5 μm, and is the proportion (%) of the area obtained by the above described method.

For evaluation of "machinability", two conventional blocks for processing were prepared as References 1 and 2. Each block was as follows:

(Reference 1) a block whose main crystalline phase was of lithium metasilicate, containing 72.3 mass % of $SiO_2$, 15.0 mass % of $Li_2O$, and 1.6 mass % of $Al_2O_3$; and (Reference 2) a block including almost the same proportion of a crystalline phase of lithium metasilicate and a crystalline phase of lithium disilicate, containing 56.3 mass % of $SiO_2$, 14.7 mass % of $Li_2O$, and 2.1 mass % a of $Al_2O_3$.

For Examples and Comparative Examples, the degrees of the processing time, wear and tear on a tool, and chipping when the blocks were processed by a ceramic processing machine (CEREC™ MC XL; manufactured by Sirona Dental Systems, Inc.) compared to the blocks of Reference 1 and 2 were each evaluated. Blocks whose evaluation results of the processing time, wear and tear on a tool, and chipping were all better than those of the blocks of References 1 and 2 were represented as "good", and among them, blocks whose evaluation results were especially excellent were represented as "especially good"; blocks whose evaluation results thereof were equal to those of References 1 and 2 were represented as "equal", and blocks whose evaluation results of any of the processing time, wear and tear on a tool, and chipping were worse than those of the blocks of References 1 and 2 were represented as "bad".

TABLE 1

| | | Example 1 | Example 2 | Example 3 | Example 4 | Example 5 | Example 6 | Example 7 | Example 8 |
|---|---|---|---|---|---|---|---|---|---|
| Component | $SiO_2$ | 71.2 | 69.7 | 67.6 | 65.5 | 75.0 | 71.0 | 70.6 | 69.6 |
| | $Li_2O$ | 11.4 | 11.2 | 10.8 | 14.4 | 14.0 | 11.0 | 12.8 | 12.8 |
| | $Al_2O_3$ | 5.2 | 5.1 | 4.9 | 5.0 | 3.0 | 6.5 | 5.1 | 5.1 |
| | $P_2O_5$ | 4.6 | 5.2 | 5.7 | 6.4 | 5.0 | 5.0 | 4.2 | 4.5 |
| | $K_2O$ | 2.4 | 2.4 | 2.3 | 2.0 | 1.0 | 2.0 | 2.1 | 2.1 |
| | $Na_2O$ | 1.2 | 1.2 | 1.1 | 1.3 | 1.0 | 2.0 | 1.4 | 1.4 |
| | $ZrO_2$ | 1.9 | 1.8 | 1.8 | 3.1 | 1.0 | 1.0 | 3.8 | 3.8 |
| | SrO | | 1.3 | | | | | | |
| | $TiO_2$ | | 0.3 | | | | | | |
| | $La_2O_3$ | | | | | | 0.5 | | |
| | BaO | | | 3.0 | | | | | |
| | $V_2O_5$ | 0.3 | 0.5 | 0.7 | 0.5 | | 0.5 | | |
| | $CeO_2$ | 0.7 | 0.2 | 0.5 | 1.0 | | 0.2 | | |
| | $Er_2O_3$ | 0.6 | 0.4 | 0.5 | 0.4 | | 0.3 | 0.1 | 0.8 |
| | MnO | 0.1 | 0.2 | 0.4 | 0.1 | | | | |
| | $Fe_2O_3$ | 0.1 | 0.2 | 0.5 | 0.2 | | | | |
| | $Tb_4O_7$ | 0.4 | 0.3 | 0.2 | 0.1 | | 1.0 | | |
| Proportion | | at most 1% | at most 1% | at most 1% | at most 1% | at most 1% | at most 1% | 21% | 11% |
| Machinability | | especially excellent | especially excellent | especially excellent | especially excellent | especially excellent | especially excellent | equal | good |

| | | Example 9 | Example 10 | Comparative Example 1 | Comparative Example 2 | Comparative Example 3 | Comparative Example 4 |
|---|---|---|---|---|---|---|---|
| Component | $SiO_2$ | 69.6 | 65.6 | 71.0 | 71.5 | 72.7 | 70.7 |
| | $Li_2O$ | 12.8 | 12.8 | 12.8 | 13.7 | 11.7 | 11.9 |
| | $Al_2O_3$ | 5.1 | 5.1 | 5.2 | 5.3 | 5.3 | 5.2 |
| | $P_2O_5$ | 4.9 | 9.0 | 3.0 | 3.0 | 2.5 | 2.6 |
| | $K_2O$ | 2.1 | 2.1 | 1.4 | 1.4 | 2.5 | 2.4 |
| | $Na_2O$ | 1.4 | 1.4 | 2.1 | 2.1 | 1.2 | 1.1 |
| | $ZrO_2$ | 3.8 | 3.8 | 1.0 | 1.8 | 1.9 | 3.1 |
| | SrO | | | | | | 1.3 |
| | $TiO_2$ | | | | | | 0.3 |
| | $La_2O_3$ | | | | 0.5 | | |
| | BaO | | | | | 1.0 | 0.5 |
| | $V_2O_5$ | | | 1.0 | 0.6 | 0.4 | 0.1 |
| | $CeO_2$ | | | 1.0 | 0.1 | 0.1 | 0.4 |
| | $Er_2O_3$ | 0.4 | 0.3 | 0.5 | 0.1 | 0.4 | 0.2 |
| | MnO | | | 0.4 | | 0.1 | 0.1 |
| | $Fe_2O_3$ | | | 0.5 | | 0.2 | |
| | $Tb_4O_7$ | | | 0.2 | | | |
| Proportion | | 7% | at most 1% | 27% | at least 50% | at least 50% | at least 50% |
| Machinability | | good | especially excellent | bad | bad | bad | bad |

As can be seen from Table 1, machinability of the blocks for dental prostheses of Examples are good although the main crystal thereof was lithium disilicate. The blocks of both Examples and Comparative Examples had necessary strength, and satisfied the above described preferred requirements concerning voids and particulate matters.

REFERENCE SIGNE LIST

10 block for dental prostheses

The invention claimed is:

1. A block for dental prostheses before being machined to form a dental prosthesis, the block comprising:
60 mass % to 80 mass % of $SiO_2$;
10 mass % to 20 mass % of $Li_2O$;
5.1 mass % to 15 mass % of $Al_2O_3$; and
6.4 mass % to 10 mass % of $P_2O_5$, wherein
the block is in the form of a column or a board, and the block being of a material that is configured to be machined into a dental prosthesis without any required additional heat treatment after machining,
a main crystalline phase of the block being of lithium disilicate, and
when the block is observed in a field of view of a partially enlarged cross section of the block, a proportion of a total area of crystals having a length of at least 0.5 μm, the crystals appearing in the field of view, to an area of the field of view is at most 21%.

2. The block according to claim 1, wherein the proportion is at most 1%.

3. The block according to claim 1, the block comprising: an oxide of at least one element selected from Na, K, Ca, Sr, Ba, Mg, Rb, Cs, Fr, Be and Ra.

4. The block according to claim 1, the block comprising: at least one of an oxide of Ti and an oxide of Zr.

5. The block according to claim 1, the block comprising: at least one selected from $V_2O_5$, $CeO_2$, $Er_2O_3$, MnO, $Fe_2O_3$ and $Tb_4O_7$.

6. The block according to claim 1, wherein said machining is cutting.

7. The block according to claim 1, wherein an area of voids in the cross section to an area of the cross section is at most 2% on average.

8. The block according to claim 1, wherein no particulate matter of a coloring agent is seen in a micrograph of the cross section at magnification ×200.

* * * * *